United States Patent
Ward et al.

[11] 3,797,908
[45] Mar. 19, 1974

[54] OPTICAL ARRANGEMENTS AND APPARATUS

[75] Inventors: Brooke Armitage Ward, Goring-on-Thames; David A. Reynolds, Didcot, both of England

[73] Assignee: United Kingdom Atomic Energy Authority, London, England

[22] Filed: Feb. 22, 1973

[21] Appl. No.: 334,711

Related U.S. Application Data

[63] Continuation of Ser. No. 121,921, March 8, 1971, abandoned.

[30] Foreign Application Priority Data

Mar. 11, 1970 Great Britain .................. 11774/70

[52] U.S. Cl. ............ 350/7, 350/285, 350/294, 178/7.6
[51] Int. Cl. ............................................. G02b 17/00
[58] Field of Search ............... 350/6, 7, 55, 41, 187, 350/202, 294, 285; 356/24; 178/7.6; 95/15

[56] References Cited
UNITED STATES PATENTS

| | | | |
|---|---|---|---|
| 1,136,761 | 4/1915 | Becker | 95/15 |
| 3,447,852 | 6/1969 | Barlow | 350/7 |
| 3,532,425 | 10/1970 | Silverberg | 350/6 |
| 2,454,959 | 11/1948 | Barnes | 356/24 |
| 3,411,852 | 11/1968 | Marinozzi | 350/294 |
| 2,964,590 | 12/1960 | Gillette | 350/187 |
| 3,533,685 | 10/1970 | Littmann et al. | 350/202 |

*Primary Examiner*—David Schonberg
*Assistant Examiner*—Michael J. Tokar
*Attorney, Agent, or Firm*—Larson, Taylor & Hinds

[57] ABSTRACT

Optical arrangements are described in which an optical beam is reflected by means of a mirror on to a working surface, and is caused to be deflected over the working surface but is automatically maintained continuously in focus on the working surface during such deflection. In some embodiments, the mirror is a plane mirror which is movable about two transverse axes to deflect the beam over the surface, and the optical beam is directed on to the plane mirror via a focussing element, such as a convex lens or mirror, which is linearly movable to maintain the focus on the working surface. In other embodiments, the mirror is fixed and concave, and the optical beam passes through an axial aperture in the mirror and strikes a convex mirror which reflects it on to the concave mirror and thence on to the working surface. The convex mirror is angularly movable about two transverse axes to deflect the beam over the working surface and is also linearly movable along the axis of the concave mirror to maintain the focus.

22 Claims, 14 Drawing Figures

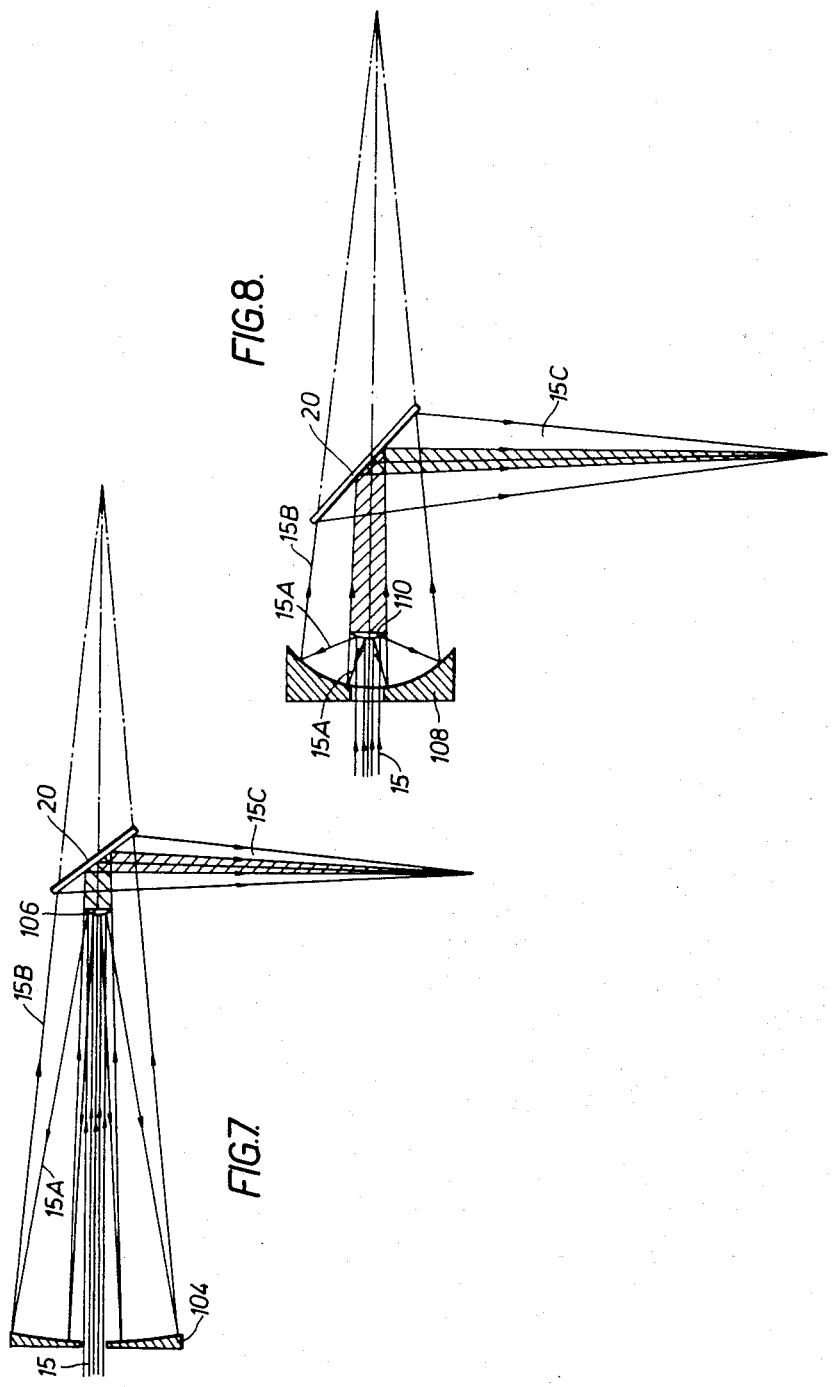

3,797,908

OPTICAL ARRANGEMENTS AND APPARATUS

This is a continuation, division, of application Ser. No. 121,921 filed Mar. 8, 1971 now abandoned.

BACKGROUND OF THE INVENTION

This invention relates to optical apparatus. Optical apparatus embodying the invention may advantageously be used for scanning a laser beam over a working surface but is by no means limited to such an application.

Optical apparatus for scanning a working surface is known in which a plane mirror is arranged to be tiltable to and fro to carry out the scan. In such an arrangement, however, the optical path length from the plane mirror to the working surface may vary during the scan, and a problem of continuously maintaining the scan in focus arises.

In an attempt to overcome this problem, an optical arrangement has been proposed in which the plane mirror is moved bodily to and fro as it tilts, so as to compensate for the change in path length caused by the tilting.

Such an arrangement may, however, involve complexities owing for example, to the difficulty of controlling the tilting and bodily movement of the plane mirror, which may be of relatively large size, and these complexities may reduce the possible scanning speed for a given scanning area.

An object of the invention, therefore, is to provide improved optical apparatus.

A more specific object of the invention is to provide improved optical apparatus which scans a working surface and maintains the scan continuously in focus without the necessity of bodily movement of a plane mirror.

Another object of the invention is to provide improved optical apparatus which has reduced or zero spherical aberration.

A further object of the invention is to provide improved optical apparatus which scans a working surface and maintains the scan continuously in focus and does not use a plane mirror.

BRIEF SUMMARY OF THE INVENTION

According to the invention, therefore, there is provided an optical arrangement, comprising optical means operative to scan a working surface and including a movably mounted vergencecausing optical focussing element for focussing the scan and control means operative to adjust the focussing element in dependence on the instantaneous deflection of the point of scan from a predetermined datum and on the contour of the working surface whereby to maintain the scan continuously in focus on the working surface.

According to the invention, there is further provided an optical arrangement, comprising optical means operative to scan a working surface of a predetermined contour, at least part of the optical means being movable about two transverse axes whereby to deflect the point of scan to different points on the said surface and at least part of the optical means being movable so as to adjust the focussing of the scan on the working surface, and control means operative to control the different movements of the optical means whereby to maintain the scan continuously in focus on the working surface.

Optical apparatus embodying the invention can be constructed to carry out a scan of a working area of 6 feet across, say, at a speed in the range 100 to 500 feet per minute.

DETAILED DESCRIPTION OF PREFERRED EMBODIMENTS

Optical arrangements and apparatus embodying the invention will now be described, by way of example only, with reference to the accompanying drawings in which:

FIGS. 6 to 14 show modifications of the arrangement of FIG. 1.

The optical arrangements and apparatus to be described are for carrying out a focussed scan of a working surface. The optical arrangements and apparatus to be described are particularly useful for focussing and scanning a laser beam, such as an infra-red beam from a $CO_2$ laser for example, over the surface of a workpiece in order to carry out a materialprocessing operation such as cutting, welding, scribing, and the like, though they may be used to handle other types of optical beams and may be used where the scanning process picks up a beam from the surface instead of vice versa. The surface is, in the particular examples being described, a flat or two-dimensional surface, but need not necessarily be so. Optical apparatus in at least one of the forms to be described can be constructed to carry out scans of a working surface 6 feet across at a speed in the range 100 to 500 feet per minute.

Figure 1:
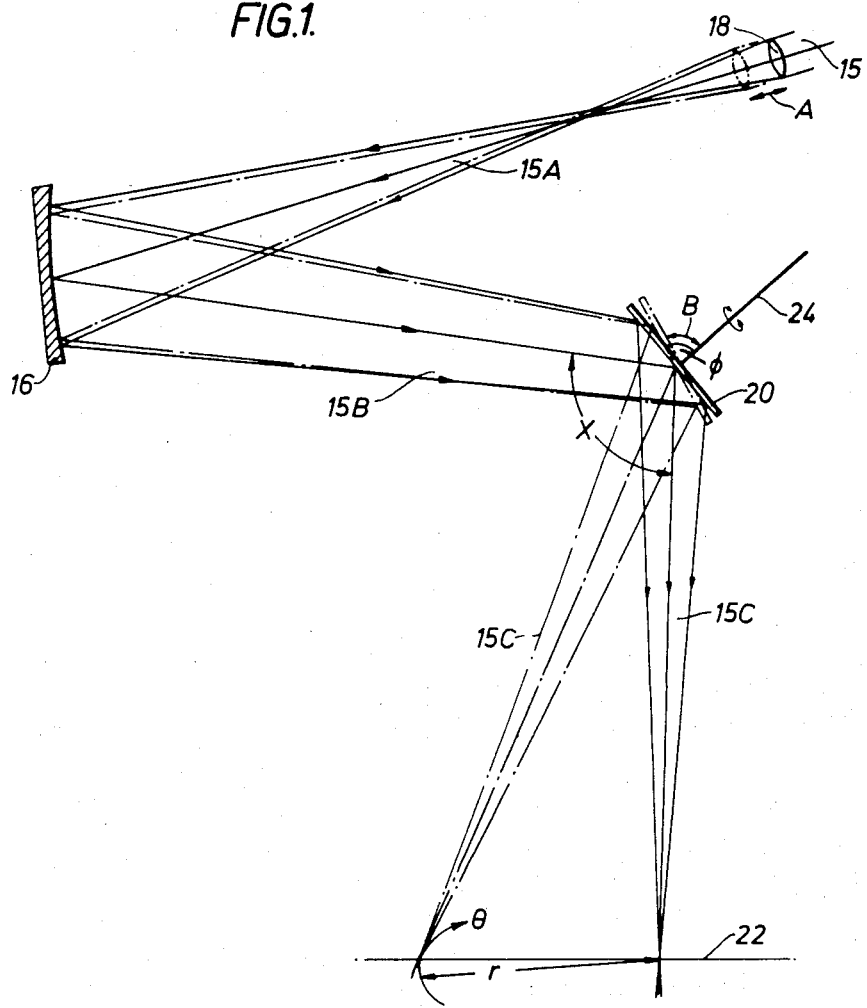
FIG. 1 is a diagrammatic view of one of the optical arrangements.
Figure 2:
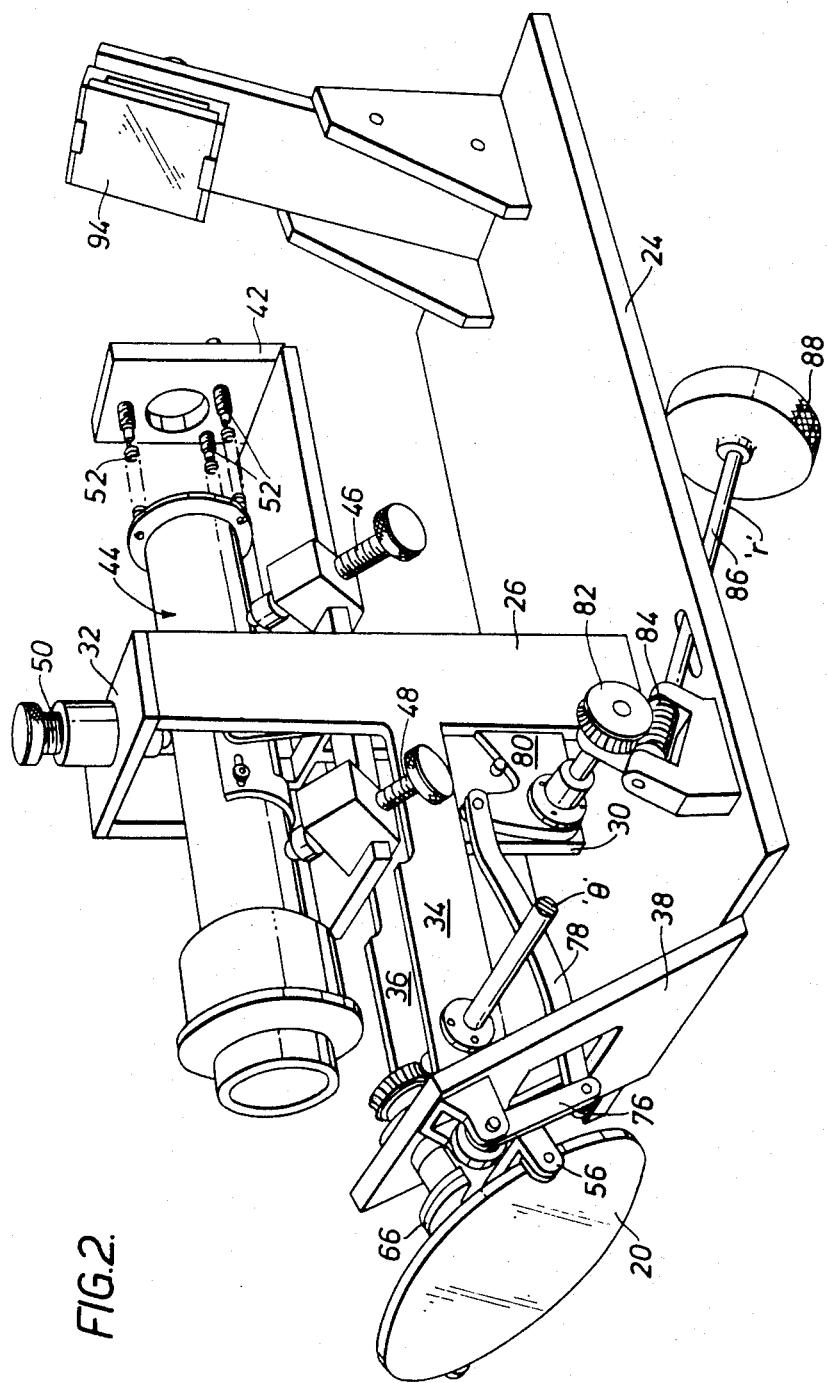
FIG. 2 is a perspective view of optical apparatus embodying the arrangement of FIG. 1.

As shown in FIG. 1, the input beam 15, such as from the laser for example, is directed on to a fixed spherical mirror 16 by an optical focussing element in the form of a corrected lens 18 which is movable to and fro in the directions of the arrows A. The beam 15B reflected from the mirror 16 strikes a plane mirror 20 and is deflected thereby so that the exit beam 15C strikes the working surface 22. The mirror 20 is supported (by means not shown) ss as to be angularly movable about a fixed axis 24 and to be angularly movable in the directions of the arrows B about a second axis which is perpendicular to the axis 24 and lies in the plane of mirror 20. These angular movements of the mirror 20 cause the beam to scan over the surface 22. When the angle $\phi$ is 90°, the beam 15C strikes the surface 22 at the origin of an $(r,\theta)$ coordinate system, that is, $r = 0$ when $\phi = 90°$. Variation of the angle $\phi$ varies the radial coordinate $r$, while angular movement of the mirror 20 about the axis 24 varies the angular coordinate $\theta$.

In accordance with a feature of the invention, the lens 18 is maintained continuously axially positioned so that the beam 15C is brought to a focus on the surface 22 irrespective of the angular position and attitude of the mirror 20. In the arrangement of FIG. 1, where the surface 22 is perpendicular to the chief ray of the beam 15C when the beam strikes the surface at the origin of the required scanning area, the required position of the lens 18, in order to achieve continuous focussing, is a function of the angle $\phi$ only. Thus, simple mechanical linkage, such as involving a cam and cam follower for example, can be provided between the mirror 20 and the lens 18 so as to move the lens in the direction of one or other of the arrows A as the angle φ changes. Such an arrangement is shown more specifically in FIGS. 2 to 5 to be described hereinafter. Instead of such mechanical linkage, however, an electrical or electromechanical arrangement can be used. For example, a transducer may be mounted to sense the angular movement of the mirror 20 about axis 24, and a second transducer may be mounted to sense the value of the angle B. These two transducers feed a control unit which produces a control signal in dependence thereon. This control signal feeds a drive unit which positions the lens 18 accordingly. The variation of the control signal with the inputs from the transducers is such that the movement of the lens 18 maintains the beam continuously in focus on the surface.

The path traced out by the focus of the beam 15C as the mirror 20 is rotated about axis 24 (the angle φ being maintained constant) is an ellipse the eccentricity of which is a function of the angle X between the chief rays of the beams 15B and 15C. This can be corrected (that is, the focus can be made to describe a circular path as the mirror 20 is rotated about axis 24) by arranging the mirror-controlling mechanism so that the angle φ is continually adjusted as a function of the angular position of the mirror 20 about the axis 24.

Apparatus embodying the optical arrangement of FIG. 1 will now be described in detail with reference to FIGS. 2 to 5 in which parts corresponding to parts in FIG. 1 are similarly referenced.

The apparatus of FIGS. 2 to 5 comprises a base 24 supporting an upstanding framework 26 having two legs 28 and 30 and a top 32. The legs 28 and 30 are respectively integral with side members 34 and 36 which are attached to an inclined apertured plate 38 fixed to the front of the base 24. The leg 28 and its side member 34 are not shown in FIG. 4. A platform 40 is rigidly supported between the legs 28 and 30 and has an upstanding apertured end plate 42. A hollow tubular structure 44 is mounted between the legs 28 and 30 by means of adjustable bolts 46 and 48, which engage blocks fast with the platform 40, and by means of a fifth bolt 50 which is threadably attached to the top 32. The ends of the bolts 46 to 50 support freely rotatable balls thus enabling the structure 44 to be axially movable. At one end, the structure 44 supports the lens 18 (see FIG. 1), and at its other end the structure 44 is attached to the end plate 42 by tension springs 52.

Figure 3:
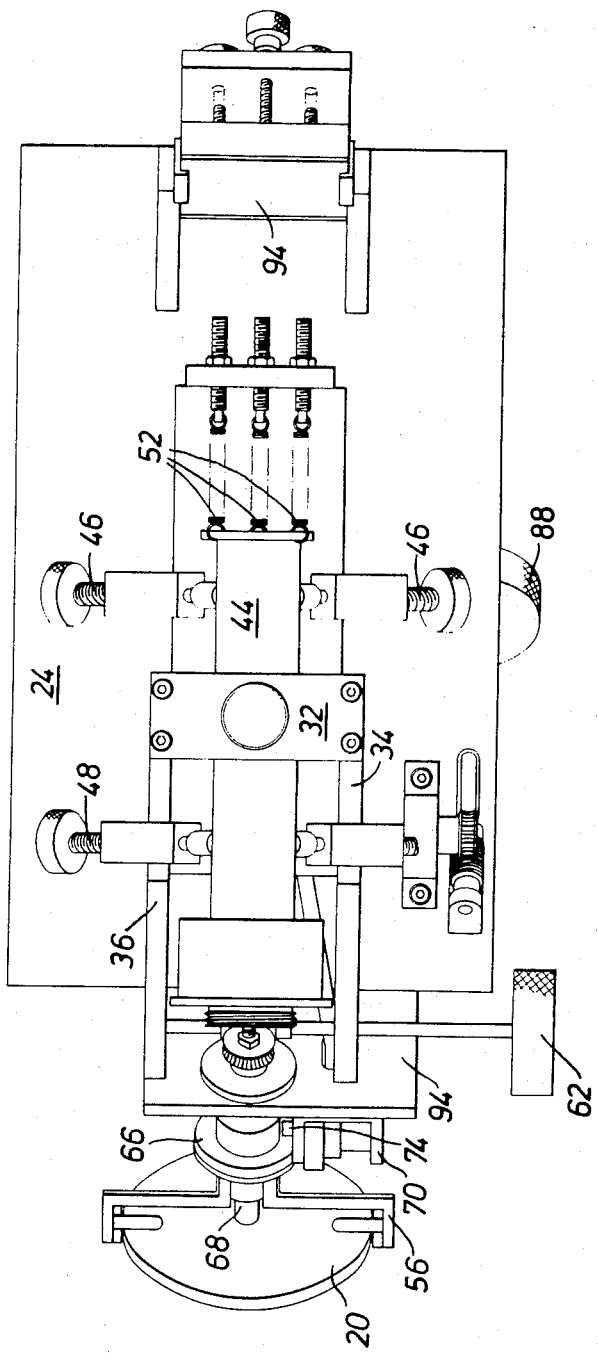
FIG. 3 is a plan view of the apparatus of FIG. 2.
Figure 4:
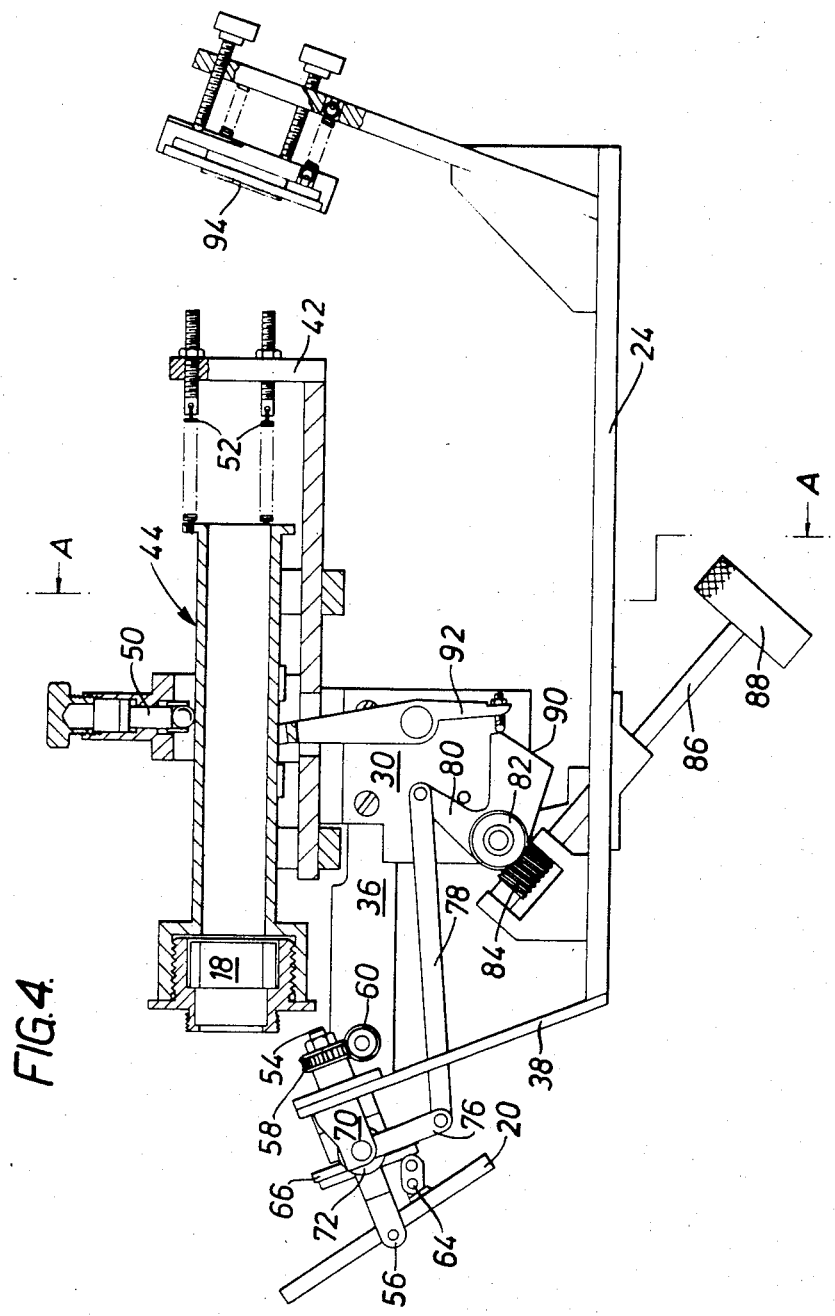
FIG. 4 is a side elevation of the apparatus of FIG. 2.
Figure 5:
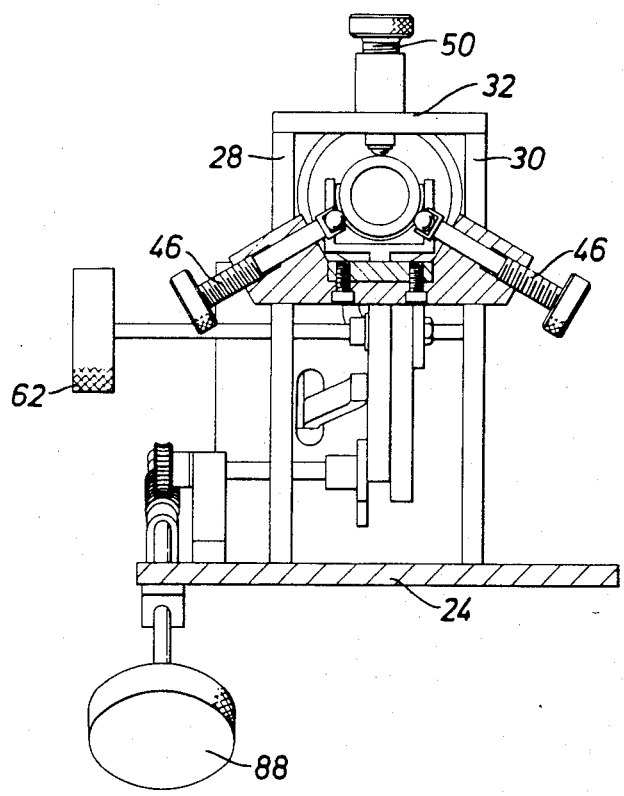
FIG. 5 is a section on the line A—A of FIG. 4.

The inclined plate 38 supports the plane mirror 20. A shaft 54, rotatably supported in the plate 38, carries a fork arrangement 56 which rotates with the shaft and carries the mirror 20. The inner end of the shaft 54 is rigid with a pinion 58 which engages a worm gear 60, the latter being rotatable by means of a knurled knob 62. The mirror 20 is supported by the fork arrangement 56 so as to be tiltable about an axis through the two ends of the fork arrangement and thus to vary the angle φ (see FIG. 1). In order to control the movement of the mirror about this axis, the rear of the mirror is attached by a pivotal link 64 to a collar 66 which is slidable to and fro along the axis of the shaft 54 but rotates with the shaft. A spring-loaded plunger 68 engages the rear of the mirror 20 and urges the collar 66 upwards. A bracket 70 supports a rotatable wheel 72 carrying an eccentric pin 74 (FIG. 3). The wheel 72 is turned by means of pivotally linked levers 76 and 78 which are attached to a bell crank 80. The bell crank 80 is angularly rotated by means of a pinion 82 and a worm gear 89, the latter being carried on a shaft 86 which protrudes through a hole in the base 80 and is rigid with a knurled knob 88. Rotation of the knob 88 causes corresponding rotation of the wheel 72. The eccentric pin 74 bears on the collar 66 and, in combination with the spring-loaded plunger 68, adjusts the axial position of the collar and thus the angle φ of tilt of the mirror 20.

The bell crank 86 is formed with a cam surface 90 which engages a cam follower on the end of a pivoted lever 92. The upper end of the lever 92 is forked and pivotally attached to the structure 44.

At its end opposite to the mirror 20, the base 80 supports an inclined plane mirror 94.

The spherical mirror 16 of FIG. 1 is not attached to the base 80 but is mounted separately therefrom (not shown in FIGS. 2 to 5).

In operation, a laser beam from a source not shown is directed on to the mirror 94 so as to be reflected through the tubular structure 44 and the lens 18. The beam 15A emerging from the lens 18 is reflected by the spherical mirror 16 on to the mirror 20 and thence on to the working surface in the manner explained in connection with FIG. 1. The θ coordinate of the position of the focussed beam 15C on the working surface is controlled by rotation of the knurled knob 62, while the r coordinate is controlled by rotation of the knurled knob 88. As the knob 88 is turned to adjust the tilt of the mirror 20, the engagement of the lever 92 with the cam surface 90 causes the structure 44 to be moved longitudinally so as to locate the lens 18 in the desired position to maintain the beam 15C continually in focus on the working surface. The profile of the cam surface 90 is designed to give the desired relationship between the tilt of the mirror 20 and the axial position of the lens 18 having regard to the configuration of the working surface (a sine relationship is used for a flat working surface).

The worm gears 60 and 84 can be split and sprung-loaded to reduce backlash.

The arrangement and apparatus described with reference to FIGS. 1 to 5 can be modified so as to focus the beam 15C on to a non-planar working surface. This modification is achieved by altering the interrelationship between the angle of the tilt φ of the mirror 20 and the axial position of the mirror 18. Thus, in the apparatus described with reference to FIGS. 2 to 5, this can be achieved by altering the profile of the cam surface 90. If the surface 22 is not perpendicular to the chief ray of the beam 15C when the beam strikes the surface at the origin of the scanned area, or if the contour of the surface so requires, the position of the lens 18 must be continuously adjusted as a function of both the angle φ and the angular position of the mirror about the axis 24 involving somewhat more complicated interconnecting linkage between the mirror-controlling mechanism and the lens 18. In other apparatus, the angle of tilt φ, the angle of the mirror 20 about axis 24, and the axial position of the lens 18 can be separately controllable by numerical control means or other programmable control means which are arranged to maintain the lens 18 in the desired axial position at any time having regard to the shape of the working surface. Instead, automatic control means may be provided in the form, for example, of a contactless surface sensor on the working surface 22 which senses the incident beam and automatically axially positions the lens 18 so as to maintain the incident beam continuously in focus on the surface. In all cases, manual override may be provided to enable initial adjustment of focus.

Since the beam 15A strikes the mirror 16 at an off-axis angle in the arrangement and apparatus described with reference to FIGS. 1 to 5, aberrations occur which may become important in larger aperture systems (when the aperture exceeds about f/10).

Figure 6:
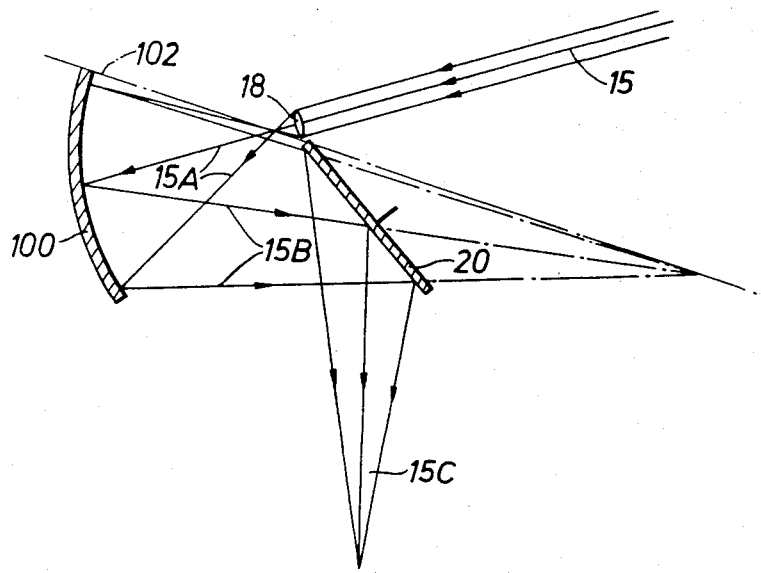

FIG. 6 illustrates a modification of the arrangement of FIG. 1 designed to reduce the aberrations in the FIG. 1 arrangement. In FIG. 6, the spherical mirror 16 is replaced by an elliptic mirror 100 which is positioned off-axis (its axis 102 being shown dotted) to receive the beam 15A. This modification reduces the aberrations encountered with the spherical mirror 16 and simplifies construction somewhat.

FIG. 7 shows a further modification which eliminates the aberration caused by the mirror 16 of FIG. 1. In FIG. 7, the spherical mirror 16 is replaced by an on-axis spherical mirror 104. The movable lens 18 is replaced by a movable concave mirror 106 which receives the input beam 15 through an axial aperture in the mirror 104. The mirror 106 is, like the lens 18 of FIG. 1, movable to and fro in the directions of the arrows A and is linked with the mirror 20 so as to be moved to and fro in correspondence with the instantaneous position of the mirror 20 in the manner explained in connection with FIG. 1. The modification of FIG. 7 causes some obscuration of the beam 15C.

In the modification shown in FIG. 8, the on-axis spherical mirror 104 of FIG. 7 is replaced by an on-axis elliptical mirror 108. The lens 18 of FIG. 1 is, in the modification of FIG. 8, replaced by a small parabolic mirror 110 which is movable to and fro, in correspondence with the setting of the mirror 20, in the manner explained with reference to mirror 106 of FIG. 7.

Figure 9:
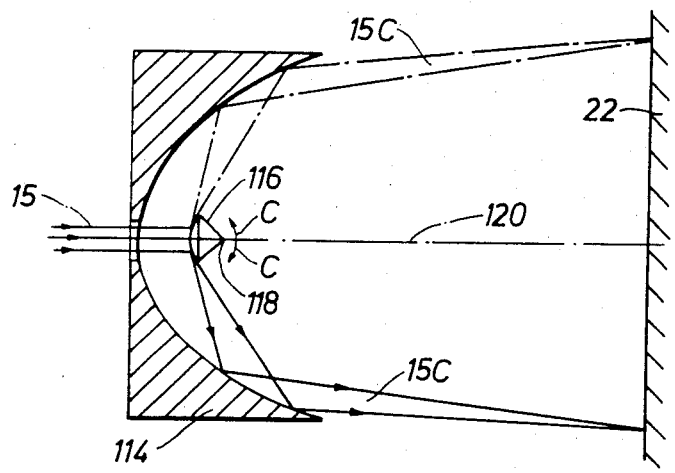

In the modification shown in FIG. 9, the spherical mirror 16 of FIG. 1 is replaced with an on-axis aspherical mirror 114. In addition, however, both the lens 18 and the plane mirror 20 of FIG. 1 are replaced by a small aspherical convex mirror 116. The mirror 116 receives the incident beam 15 and reflects it onto the mirror 114 whence it is deflected to the surface 22. The mirror 116 is pivotable about an axis through the point 118 so as to move in the direction of the arrow C: this movement defines the r coordinate of the position of the focussed beam 15C on the surface 22 and corresponds to the tilting of the mirror 20 in the FIG. 1 arrangement. In addition, the mirror 116 is angularly movable about the axis 120 which corresponds to the axis 24 of FIG. 1 and defines the θ coordinate of the position of the beam 15C on the surface 22. Finally, the mirror 116 is movable to and fro along the axis 120: this movement corresponds to the axial movement of the lens 18 of FIG. 1 and, in similar fashion to that explained in connection with FIG. 1, is linked with the angular movement of the mirror so as to maintain the beam continually in focus on the surface 22 irrespective of its position thereon.

Figure 10:
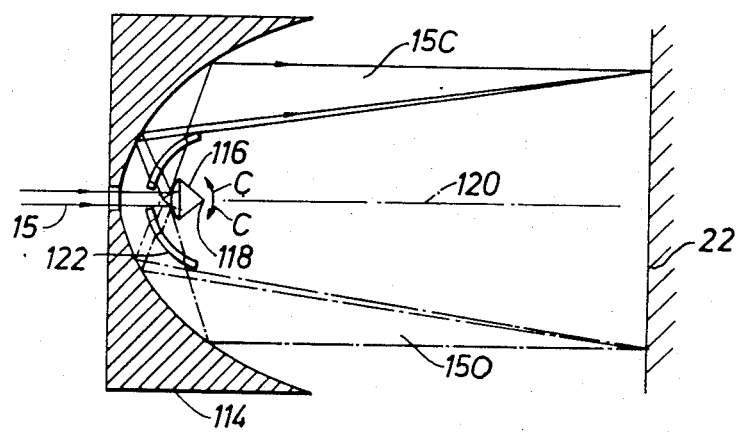

FIG. 10 shows a modification of FIG. 9 in which a corrector plate 122 is interposed between the mirror 116 and the mirror 114. The refraction caused by the corrector plate 48 enables the system to be designed with reduced parallax error; that is, the beam 15C has a near-perpendicular incidence on the surface 22.

The modifications of FIGS. 9 and 10, by combining the deflecting action of the mirror 20 of FIG. 1 with the focussing action of the lens 18, eliminate the need for a large deflecting mirror with its consequent limitations on high scanning speeds.

FIGS. 11 to 14 show different optical constructions which can be used instead of the final deflecting mirror 20 of FIG. 1.

Figure 11:
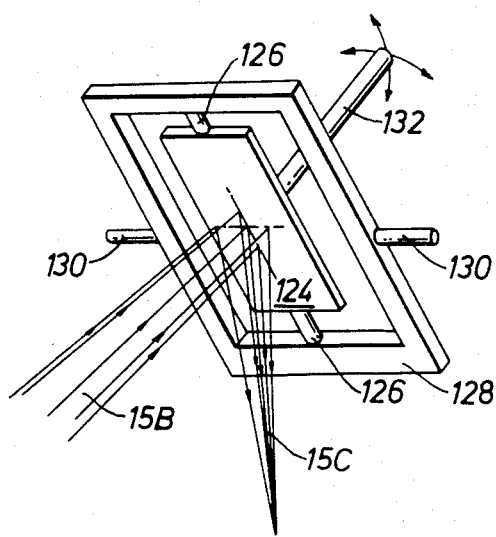

In FIG. 11, the mirror 20 is replaced by a plane mirror 124 which is used instead of the mirror 20 to reflect the beam 15C on to the working surface 22. The mirror 124 is pivotally mounted by bearings 126 inside a frame 128 which is itself pivotally mounted, by bearings 130, in a base framework (not shown). The mirror 124 is thus tiltable about two perpendicular axes by means of a control arm 132, and this tilting movement deflects the beam 15C along Cartesian coordinates on the working surface 22.

Figure 12:
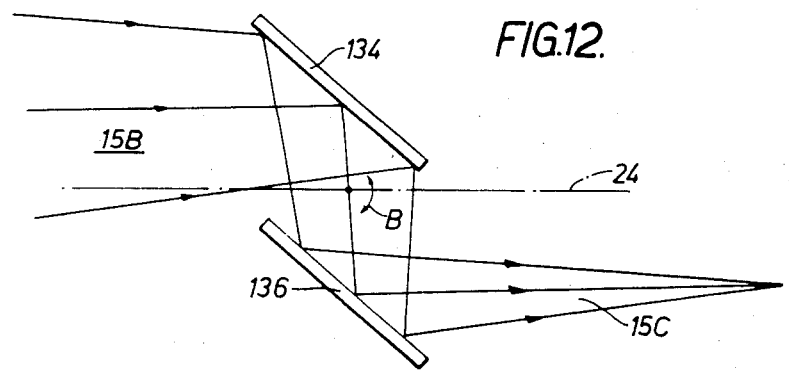

In FIG. 12, the mirror 20 of FIG. 1 is replaced by two mechanically linked plane mirrors 134 and 136. These mirrors are rotatable about the axis 24 so as to define the θ coordinate of the position of the beam 15C on the working surface, and are tiltable (together) about a perpendicular axis in the directions of the arrows B so as to define the r coordinate.

Figure 13:
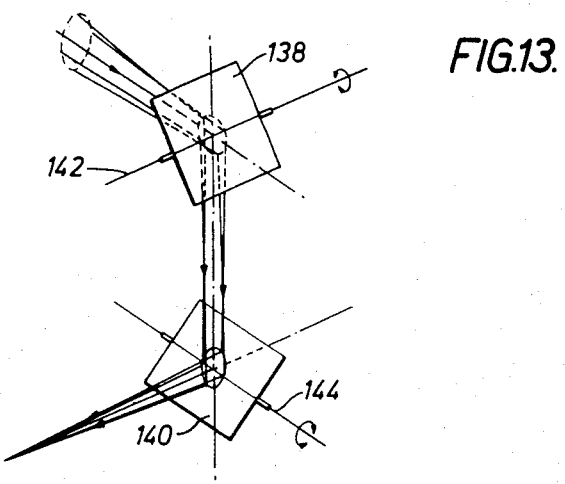

In FIG. 13, two independently movable plane mirrors 138 and 140 are used instead of the mirror 20. Mirror 138 is tiltable about an axis 142, while mirror 140 is tiltable about the perpendicular axis 144. The mirrors 138 and 140 thus control the beam position on the surface 22 according to Cartesian coordinates, the position of mirror 138 relative to its axis defining the x coordinate and the position of the mirror 140 relative to its axis defining the y coordinate.

Figure 14:
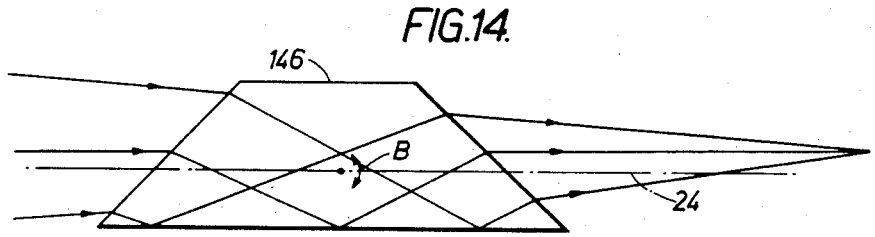

In FIG. 14, a deflectable prism 146 replaces the mirror 20. The prism reflects the incident beam 15B by total internal reflection. The prism is supported for rotation about the axis 24 so as to define the O coordinate of the position of the beam 15C on the surface 22, and is tiltable about a perpendicular axis in the directions of the arrows B so as to define the r coordinate.

In each of the arrangements illustrated in FIGS. 6 to 14, the control means for automatically maintaining the beam in focus on the working surface 22 as it scans across the surface can be the same as that described with reference to FIGS. 1 to 5. Thus, for example, it can comprise mechanical linkage of similar type to that shown in FIGS. 2 to 5, or it can comprise an electromechanical system as described with reference to FIG. 1 — in the latter case there would be a respective transducer for sensing the movement of the beam-deflecting element in each of its two axes, the transducers being arranged to feed a control unit which produces a control signal for correctly positioning the focus-determining element (in the arrangements of FIGS. 9 and 10, the beam-deflecting and focus-determining elements are the same). Instead, as described the control means could comprise a contactless photosensitive sensor on the working surface 22 which senses the incident beam and automatically positions the focus-determining element so as to maintain the incident beam continuously in focus on the surface.

The control means may alternatively take the form of a first programmable control unit for positioning the beam-deflecting element of the arrangement according to a predetermined program, and a second programmable control unit for positioning the focus-determining element according to a predetermined program, the two programs being predetermined such that the beam is automatically maintained in focus on the working surface continuously.

It will be appreciated that the term "in focus" as used herein is to be interpreted as meaning at least substantially in focus.

In the arrangements of FIGS. 6, 7, 8, 9 and 10, the focussing element (the lens 18 or the mirrors 106, 110 and 116) can be mounted in a tube of the type shown in the structure 44 in FIGS. 2 to 5, this tube being mounted for linear movement to provide the focussing action. The mirror 116 in FIGS. 9 and 10 is required to be movable about two transverse axes as well so as to deflect the beam over the working surface, and these movements could be accommodated by pivotally mounting the mirror 116 in the tube and also allowing the tube to turn about its longitudinal axis. The mirrors 20 of FIGS. 6, 7 and 8 can be moutned in similar fashion to that shown in FIGS. 2 to 5.

What is claimed is:

1. Optical apparatus comprising
   a base,
   means defining a working surface of predetermined contour fixedly positioned relative to the base,
   means defining a first optical beam path whose direction is fixed in three dimensions relative to the base,
   optical means mounted on the base between the said first path and the working surface to receive an optical beam which also passes along the said first path, the optical means being operative to scan the beam across the working surface and including a movably mounted vergence-causing optical focussing element for focussing the scan, and
   control means operatively connected to the focussing element to adjust the focussing of the scan on the working surface in dependence on its deflection from a predetermined datum whereby to maintain the scan continually in focus on the working surface.

2. Apparatus according to claim 1, in which the optical means comprises
   planar mirror means in addition to the optical focussing element and mounted to define a second optical path between the focussing element and the surface,
   first mounting means mounting the optical focussing element for linear movement along one said path to focus the scan, and
   second mounting means mounting the mirror means for continuous angular movement about at least a first axis to deflect the point of scan across the said surface.

3. Apparatus according to claim 2, in which the second mounting means includes means mounting the mirror means for angular movement about a second axis transverse to the first axis.

4. Apparatus according to claim 3, in which the planar mirror means comprises a single plane mirror, the second mounting means comprising
   means mounting the mirror for angular movement about an axis substantially in the plane of the mirror and constituting the said first transverse axis, and
   means mounting the mirror for angular movement about an axis perpendicular to the first axis and transversely intersecting the plane of the mirror and constituting the said second transverse axis, whereby the angular position of the mirror about the first axis determines the $r$ coordinate, in a $(r,\phi)$ coordinate system, of the position of the point of scan on the working surface and the angular position of the mirror about the second axis determines the $\theta$ coordinate.

5. Apparatus according to claim 3, in which the planar mirror means comprises a single plane mirror, and in which the second mounting means comprises means mounting the mirror for angular movement about two axes lying substantially in the plane of the single mirror and perpendicular to each other and constituting the said first and second transverse axes, whereby the angular position of the mirror about one of the axes establishes the x coordinate, in a Cartesian coordinate system, of the position of the point of scan on the working surface and the angular position of the mirror about the other of the two transverse axes establishes the y coordinate.

6. Apparatus according to claim 3, in which the planar mirror means comprises two rigidly interconnected plane mirrors mounted parallel to each other with their reflecting surfaces facing whereby the said second optical path passes by reflection from one mirror to the other, the said first transverse axis being defined between the two mirrors and parallel to the planes thereof whereby the angular position of the mirrors about the first axis establishes the $r$ coordinate, in an $(r,\theta)$ coordinate system, of the position of the point of scan on the working surface, and the said second transverse axis being perpendicular to the first axis whereby the angular position of the mirrors about the second axis establishes the $\theta$ coordinate.

7. Apparatus according to claim 3, in which the planar mirror means comprises first and second plane mirrors mounted with their reflecting surfaces facing whereby the said second optical path passes by reflection from one mirror to the other and in which the said second mounting means comprises
   means mounting the first mirror for movement about an axis which is substantially in the plane of the first mirror and constitutes the said first transverse axis and about which the first mirror is angularly movable whereby to establish the x coordinate, in a Cartesian coordinate system, of the position of the point of scan on the working surface, and
   means mounting the second plane mirror for independent angular movement about an axis which is perpendicular to the first axis and lies substantially in the plane of the second mirror and about which the second mirror is angularly movable to establish the y coordinate of the position of the point of scan on the working surface.

8. Apparatus according to claim 3, in which the planar mirror means comprises a prism mounted whereby the said optical path passes therethrough by total internal reflection, the first mounting means comprising
   means defining the said first transverse axis as an axis passing through the prism and about which the prism is angularly movable whereby to establish the $r$ coordinate, in a $(r,\theta)$ coordinate system, of the point of scan on the working surface, and
   means defining the said second transverse axis as an axis through the prism and perpendicular to the first axis and about which the prism is also angularly movable whereby to establish the θ coordinate.

9. Apparatus according to claim 3, in which the optical means also includes
a fixed mirror, and
means mounting the fixed mirror in the said second optical path and between the focussing element and the planar mirror means.

10. Apparatus according to claim 9, in which:
the said focussing element is a convex lens, and
the fixed mirror is a concave mirror mounted off-axis with respect to the said second optical path from the convex lens.

11. Apparatus according to claim 9, in which:
the said fixed mirror is a concave mirror defining an axial aperture therethrough, and
the focussing element is a convex mirror mounted to face the axial aperture and whereby the said linear movement thereof takes place along an axis passing through the said aperture.

12. Optical apparatus comprising
a base,
means defining a working surface of predetermined contour fixedly positioned relative to the base,
means defining a first optical beam path whose direction is fixed in three dimensions relative to the base,
a vergence-causing optical focussing element,
means mounting the focussing element on the base between the said first path and the working surface to receive an optical beam which also passes along the said first path, the said mounting means mounting the focussing element for movement about first and second transverse axes whereby to scan the beam across the said working surface, and mounting it also to be movable linearly to adjust the focussing of the scan, and
control means operatively connected to the focussing element to adjust the focussing of the scan on the working surface in dependence on the deflection of the scan from a predetermined datum whereby to maintain the scan continuously in focus on the working surface.

13. Apparatus according to claim 1, in which the optical means comprises a concave mirror having an axial aperture which defines the said first optical beam path, the concave mirror being mounted to define a second optical path between the focussing element and the working surface, and in which the focussing element is a convex mirror mounted in alignment with the said aperture to face the reflecting surface of the concave mirror to receive and reflect the said optical beam which passes through the aperture, the convex mirror being mounted for linear movement to and fro along the axis of the concave mirror to adjust the focus of the scan, and also being angularly movable about the axis of the concave mirror and about an axis perpendicular thereto whereby the angular positions of the convex mirror about these two axes respectively establish the r and θ coordinates of the position of the point of scan on the working surface.

14. Apparatus according to claim 1, in which the said control means comprises linkage responsive to that movement of the optical means which determines the deflection of the beam on the working surface and connected to control, in dependence thereon, that movement of the focussing element which determines the focussing of the scan on the working surface.

15. Apparatus according to claim 3, in which the control means comprises
first linkage means mounted to sense movement of the mirror means about at least one of the said transverse axes,
second linkage means connected to the focussing element mounting means for linearly moving the focussing element, and
motion-transmitting means arranged to transmit the movement sensed by the first linkage means to the second linkage means whereby the resultant linear movement of the focussing element maintains the scan in focus on the working surface.

16. Apparatus according to claim 1, in which the control means comprises
first programmable control means connected to control the deflection-determining movement of the optical means according to a predetermined program, and
second programmable control means connected to control the focussing-determining movement of the focussing element to a predetermined program,
the two programs being arranged whereby the scan is maintained continuously in focus on the working surface.

17. Apparatus according to claim 1, in which the control means comprises
beam sensing means on the working surface and operative to produce a control signal in response to an incident beam thereon, and
means responsive to the control signal to control the focussing-determining movement of the focussing element in a manner such as to maintain the scan continuously in focus on the surface.

18. Apparatus according to claim 1, including a source producing a laser-beam and directing it to the optical means along said first optical path for scanning and focussing thereby onto the said surface.

19. Optical apparatus, comprising
means defining a working surface,
optical means mounted to perform a focussable scan of the working surface,
first means mounting at least part of the optical means for respective angular movements about first and second transverse axes whereby to deflect the point of scan to different points on a predetermined area of the said surface, which area has a length and breadth greater than those of the said point of scan,
second means mounting at least part of the optical means for linear movement so as to adjust the focussing of the scan on the working surface, and
control means operative to control the linear, focussing determining movement of the optical means in dependence on at least one of the angular deflecting determining movements thereof whereby to maintain the beam continuously in focus on the working surface.

20. Apparatus according to claim 19, in which the said part of the optical means mounted by the first mounting means comprises planar mirror means, and the said part mounted by the second mounting means comprises an optical focussing element, the planar mirror means defining an optical path between the optical focussing element and the working surface.

21. Apparatus according to claim 19, in which the optical means comprises an optical focussing element, and in which the first mounting means mounts the focussing element for said angular movements about the two transverse axes and the second mounting means mounts the focussing element for said linear movement to adjust the focussing of the scan.

22. Apparatus according to claim 19, including an optical beam source and in which:

the optical means comprises a curved mirror defining a central aperture therethrough and mounted whereby the said optical beam passes through the aperture, and a convex mirror of smaller diameter than the concave mirror and mounted to face the concave mirror and in line with the aperture to receive the optical beam therethrough and to reflect it on to the concave mirror and thence on to the said working surface; and the said first mounting means comprises means mounting the convex mirror for angular movement about an axis transverse to the surface of the concave mirror and passing through the aperture and also for angular movement about a perpendicular axis; and the second mounting means comprises means mounting the convex mirror for linear movement along the said axis transverse to the surface of the concave mirror and passing through the aperture.

* * * * *